United States Patent
Kim et al.

(10) Patent No.: US 10,922,975 B2
(45) Date of Patent: Feb. 16, 2021

(54) PEDESTRIAN COLLISION PREVENTION APPARATUS AND METHOD CONSIDERING PEDESTRIAN GAZE

(71) Applicants: HYUNDAI MOTOR COMPANY, Seoul (KR); KIA MOTORS CORPORATION, Seoul (KR)

(72) Inventors: Yoon Soo Kim, Suwon-si (KR); Suk Ki Min, Suwon-si (KR); Dong Hyun Sung, Hwaseong-si (KR); Seung Wook Park, Yongin-si (KR); Yong Seok Kwon, Suwon-si (KR); Sang Min Lee, Seoul (KR); Tae Young Lee, Yongin-si (KR); Min Byeong Lee, Seongnam-si (KR); Eung Seo Kim, Suwon-si (KR); In Yong Jung, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 15/833,616

(22) Filed: Dec. 6, 2017

(65) Prior Publication Data
US 2018/0190120 A1 Jul. 5, 2018

(30) Foreign Application Priority Data
Dec. 30, 2016 (KR) .......................... 10-2016-0184288

(51) Int. Cl.
*G08G 1/16* (2006.01)
*B60W 30/09* (2012.01)
(Continued)

(52) U.S. Cl.
CPC ............... *G08G 1/166* (2013.01); *B60Q 1/44* (2013.01); *B60Q 5/005* (2013.01); *B60T 7/22* (2013.01);
(Continued)

(58) Field of Classification Search
None
See application file for complete search history.

(56) References Cited

U.S. PATENT DOCUMENTS 10,814,840 B2 * 10/2020 Kim ..................... G08G 1/166
10,821,946 B2 * 11/2020 Kim ..................... B60W 30/09
(Continued)

FOREIGN PATENT DOCUMENTS

DE 102011112985 A1 3/2013
JP 2005-182452 A 7/2005
(Continued)

OTHER PUBLICATIONS

Korean Office Action dated Aug. 16, 2018 issued in Korean Patent Application No. 10-2016-0184288.
(Continued)

*Primary Examiner* — Nicholas K Wiltey
(74) *Attorney, Agent, or Firm* — Morgan, Lewis & Bockius LLP

(57) ABSTRACT

An apparatus for activating a pedestrian detection and collision mitigation system (PDCMS) of a vehicle includes: a front detection sensor detecting a presence of a pedestrian on a driving lane of the vehicle, gaze information of the pedestrian, and a distance and a relative speed between the pedestrian and the vehicle; a vehicle sensor detecting at least any one of a speed, an acceleration, a steering angle, a steering angular velocity, and a pressure of a master cylinder of the vehicle; an electronic control unit activating a PDCMS function based on information detected by the front detection sensor and the vehicle sensor; and a warning unit operated to inform a driver of a collision of the pedestrian with the vehicle by a control of the electronic control unit.

12 Claims, 17 Drawing Sheets

(51) Int. Cl.
  *B60W 30/095*  (2012.01)
  *B60Q 1/44*    (2006.01)
  *B60Q 5/00*    (2006.01)
  *B60T 7/22*    (2006.01)
  *G06K 9/00*    (2006.01)
  *G08G 1/052*   (2006.01)
  *B60W 50/14*   (2020.01)

(52) U.S. Cl.
  CPC ........ *B60W 30/09* (2013.01); *B60W 30/0953* (2013.01); *B60W 30/0956* (2013.01); *G06K 9/0061* (2013.01); *G08G 1/052* (2013.01); *B60T 2201/024* (2013.01); *B60W 2050/143* (2013.01); *B60W 2050/146* (2013.01); *B60W 2420/42* (2013.01); *B60W 2420/52* (2013.01); *B60W 2510/182* (2013.01); *B60W 2520/10* (2013.01); *B60W 2520/105* (2013.01); *B60W 2540/18* (2013.01); *B60W 2554/00* (2020.02); *B60W 2555/20* (2020.02); *B60W 2710/182* (2013.01); *B60W 2720/10* (2013.01)

(56) References Cited

U.S. PATENT DOCUMENTS

| | | | | |
|---|---|---|---|---|
| 2005/0046272 | A1* | 3/2005 | Rieth | B60T 7/042 303/113.4 |
| 2005/0288146 | A1* | 12/2005 | Englisch | B60K 6/485 477/2 |
| 2009/0010495 | A1* | 1/2009 | Schamp | B60R 21/0134 382/106 |
| 2009/0030619 | A1* | 1/2009 | Kameyama | G06F 16/636 702/19 |
| 2011/0032119 | A1* | 2/2011 | Pfeiffer | B60K 35/00 340/905 |
| 2011/0125372 | A1* | 5/2011 | Ito | B60R 21/0132 701/45 |
| 2012/0185130 | A1* | 7/2012 | Ekchian | B60Q 1/2603 701/36 |
| 2012/0300078 | A1* | 11/2012 | Ogata | G06K 9/00362 348/148 |
| 2013/0343071 | A1* | 12/2013 | Nagaoka | B60Q 9/008 362/466 |
| 2014/0098232 | A1* | 4/2014 | Koike | B60R 21/01542 348/148 |
| 2014/0129001 | A1* | 5/2014 | Staudenmaier | G08B 21/06 700/79 |
| 2014/0176350 | A1* | 6/2014 | Niehsen | B62D 15/025 340/988 |
| 2014/0183933 | A1* | 7/2014 | Kuhlman | B60T 1/10 303/3 |
| 2015/0161796 | A1* | 6/2015 | Choi | H04N 5/33 348/77 |
| 2016/0063315 | A1* | 3/2016 | Lim | G06K 9/00288 701/36 |
| 2016/0075332 | A1* | 3/2016 | Edo-Ros | B60W 30/0956 701/70 |
| 2016/0272172 | A1 | 9/2016 | Lee | |
| 2016/0375900 | A1* | 12/2016 | Laur | B60W 30/09 701/41 |
| 2017/0015260 | A1* | 1/2017 | Mack | G02B 27/017 |
| 2017/0329329 | A1* | 11/2017 | Kamhi | B60W 50/14 |
| 2018/0186368 | A1* | 7/2018 | Kim | B60W 30/0953 |
| 2018/0190120 | A1* | 7/2018 | Kim | B60W 30/09 |

FOREIGN PATENT DOCUMENTS

| | | |
|---|---|---|
| JP | 2006-163637 A | 6/2006 |
| JP | 2007-230369 A | 9/2007 |
| JP | 2007-253918 A | 10/2007 |
| JP | 2008-143372 A | 6/2008 |
| JP | 2011-063187 A | 3/2011 |
| JP | 2011-225159 A | 11/2011 |
| JP | 2014-059841 A | 4/2014 |
| JP | 2016-009251 A | 1/2016 |

OTHER PUBLICATIONS

Extended European Search Report dated Jun. 1, 2018 issued in European Patent Application No. 17205655.8.

Office Action issued in corresponding Korean Patent Application No. 10-2016-0184288 dated Feb. 21, 2019, with English translation.

\* cited by examiner

【FIG. 1】
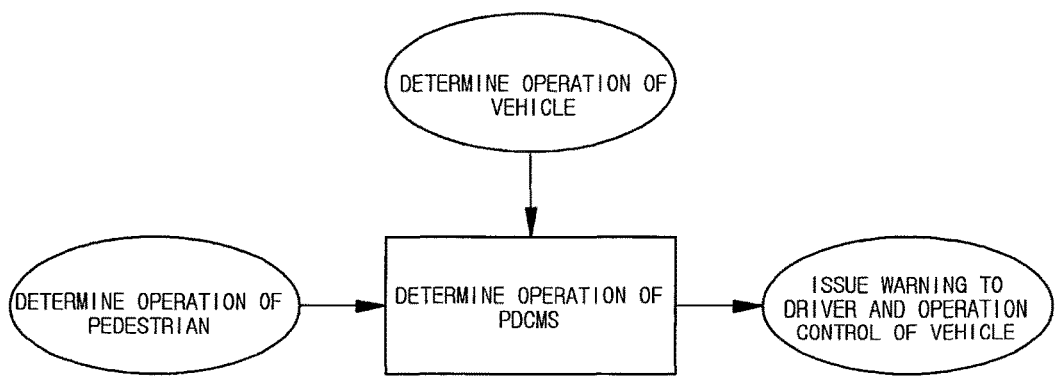
【FIG. 2】
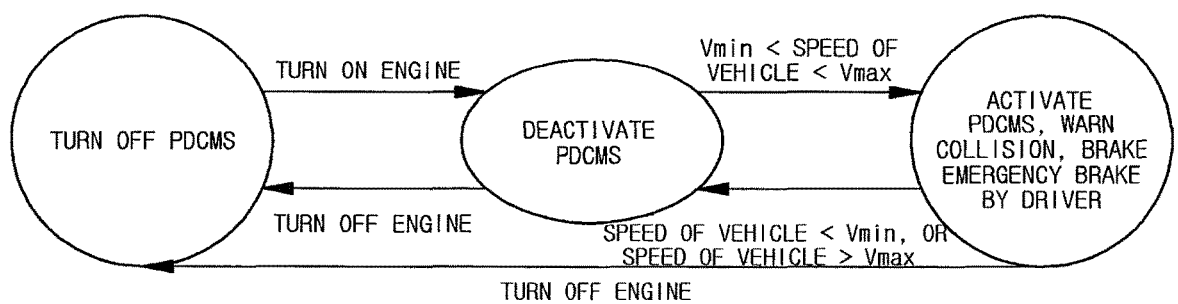

【FIG. 3】
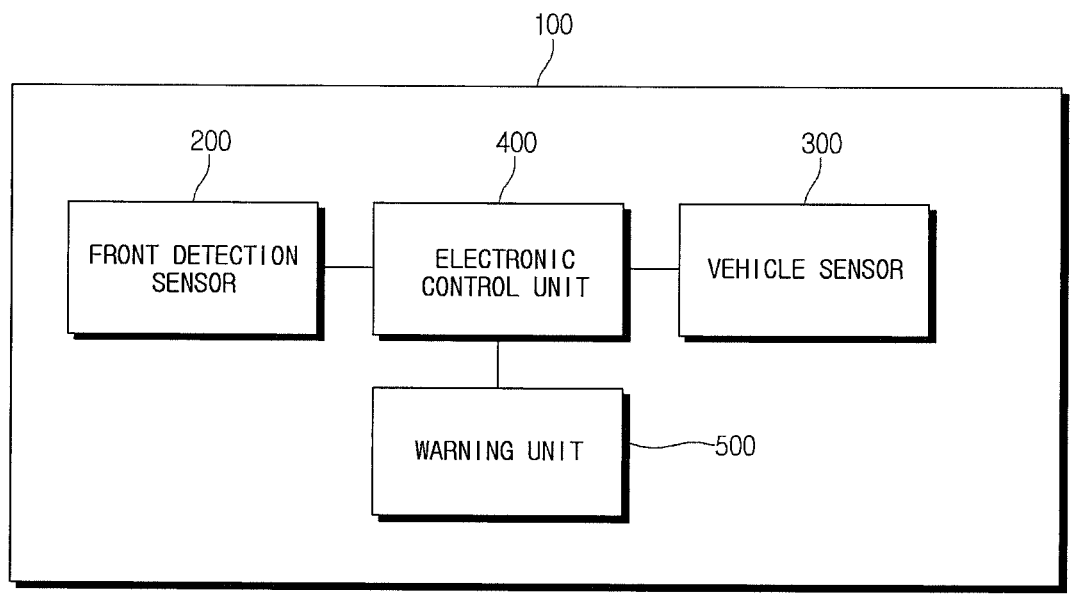
【FIG. 4】
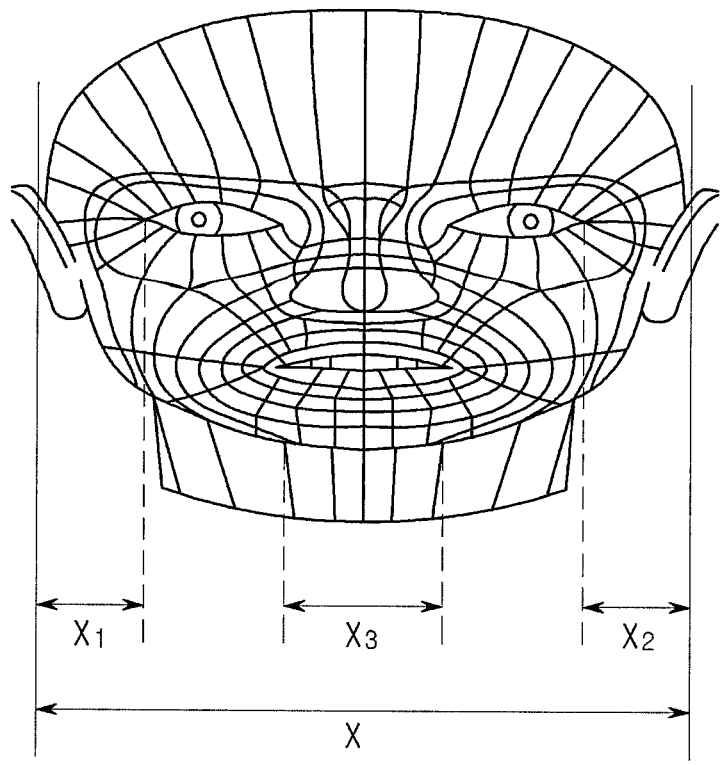

[FIG. 5]
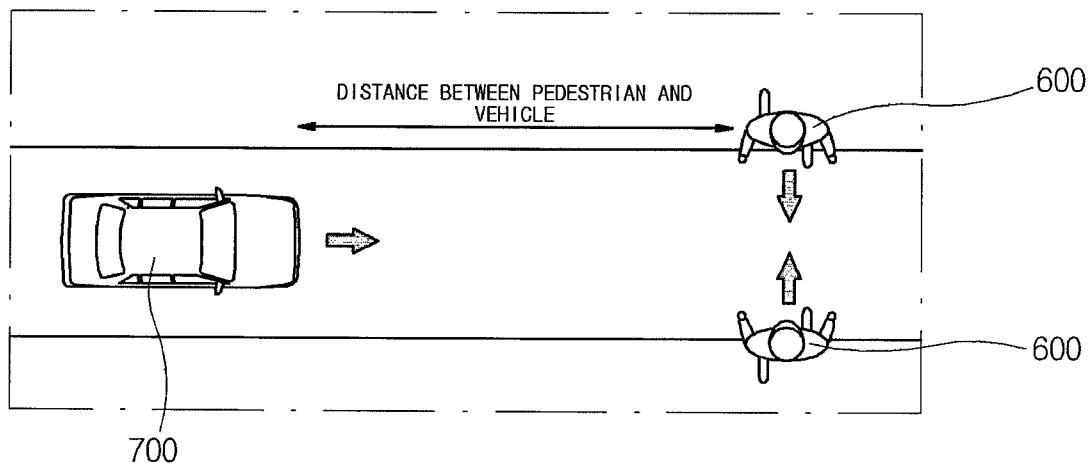
[FIG. 6]
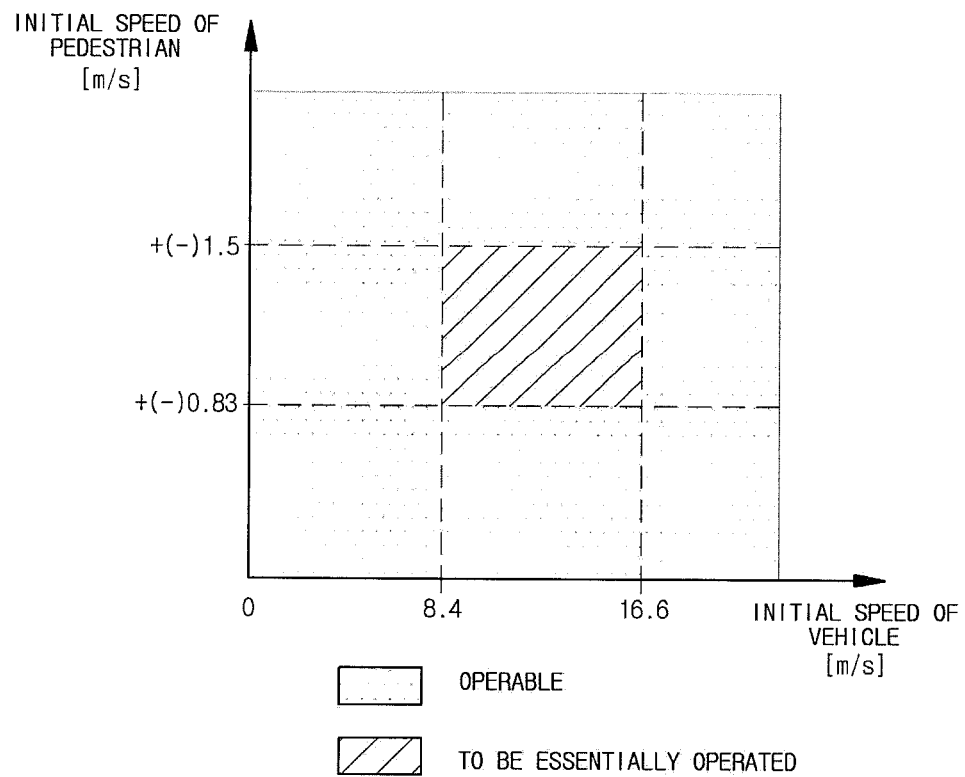

【FIG. 7】
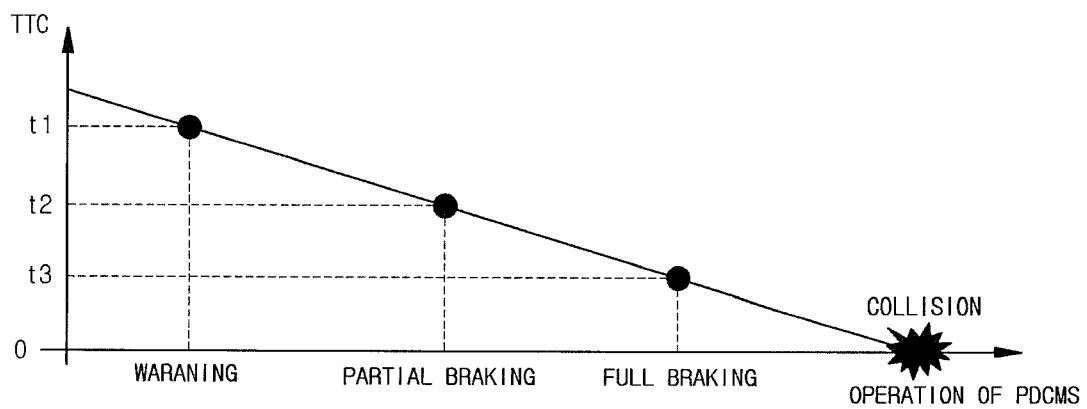
【FIG. 8A】
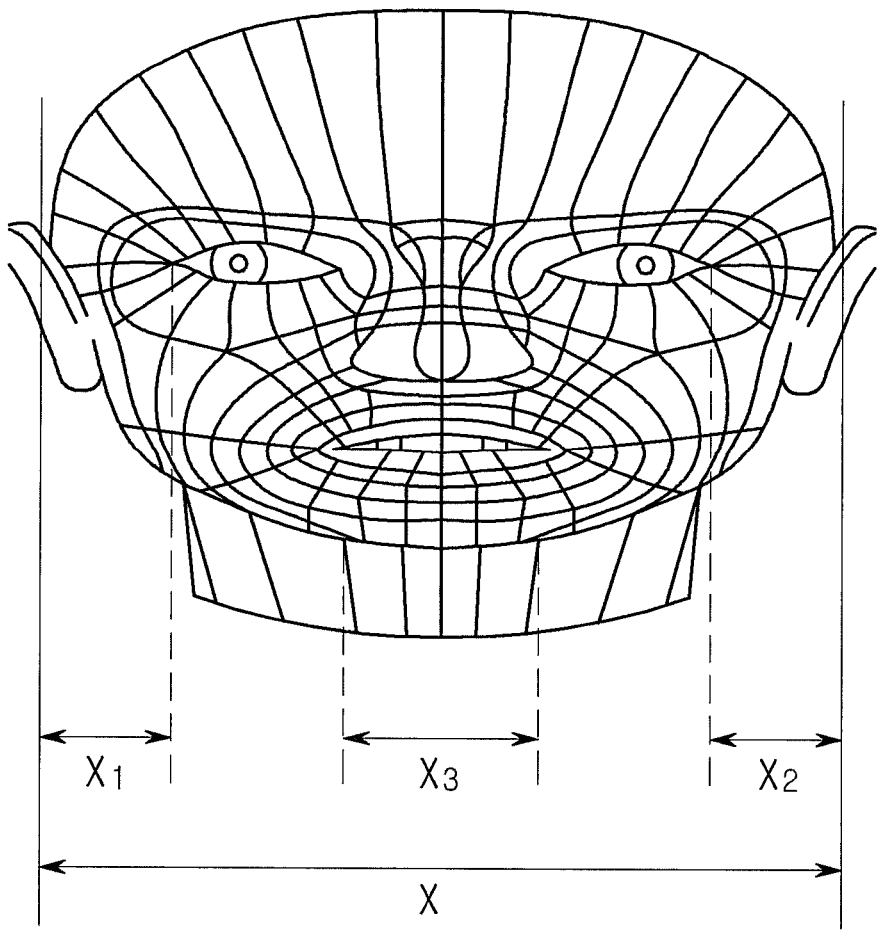

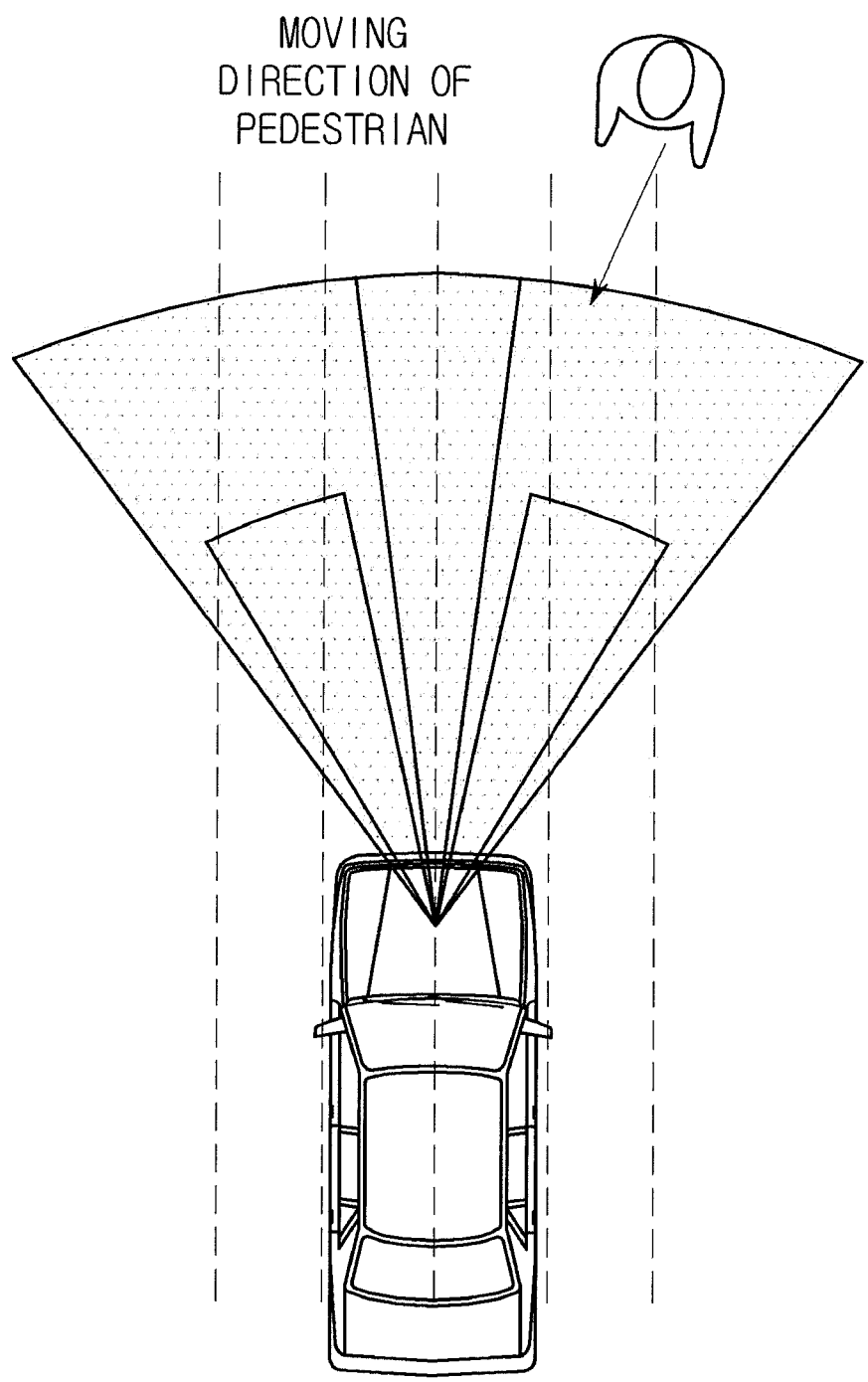
[FIG. 8B]

[FIG. 8C]
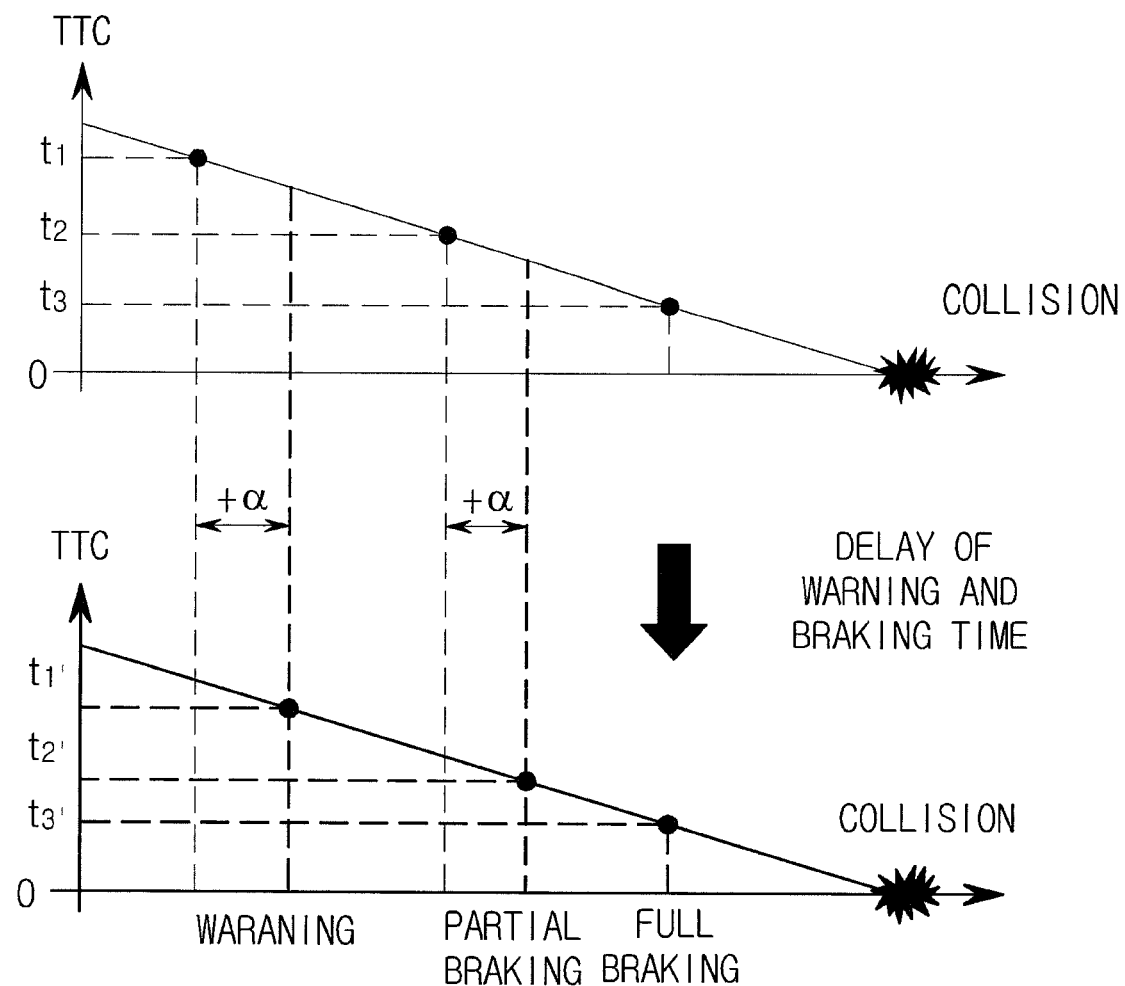

[FIG. 9A]
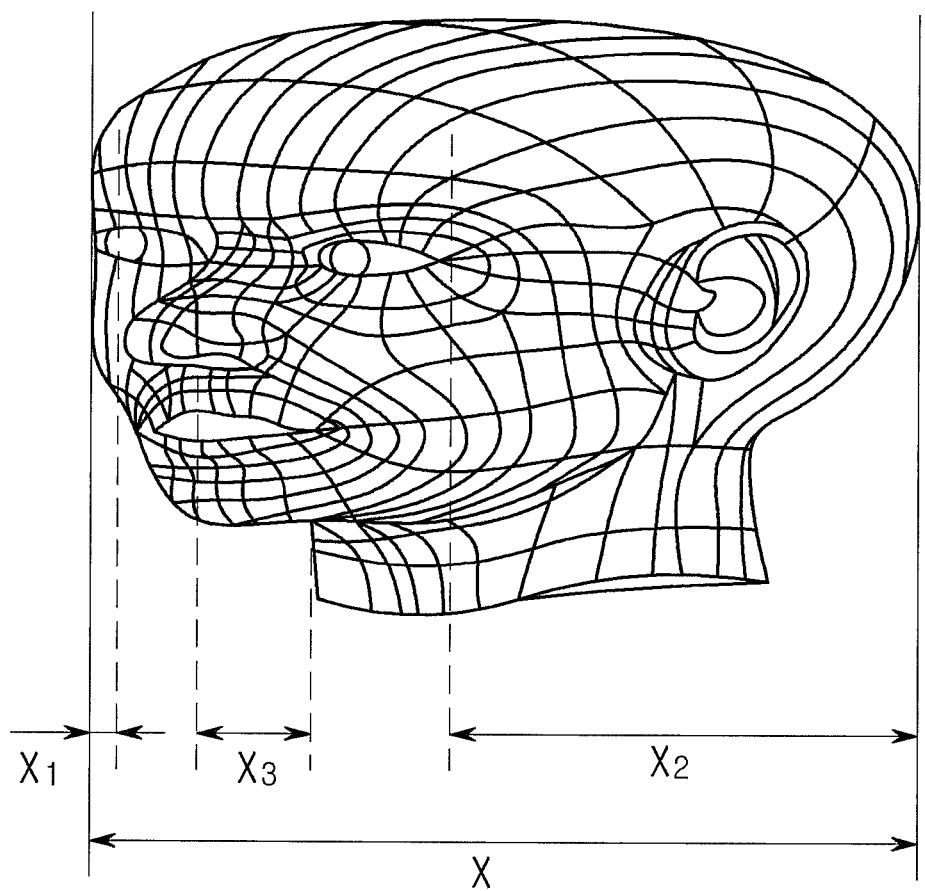

[FIG. 9B]
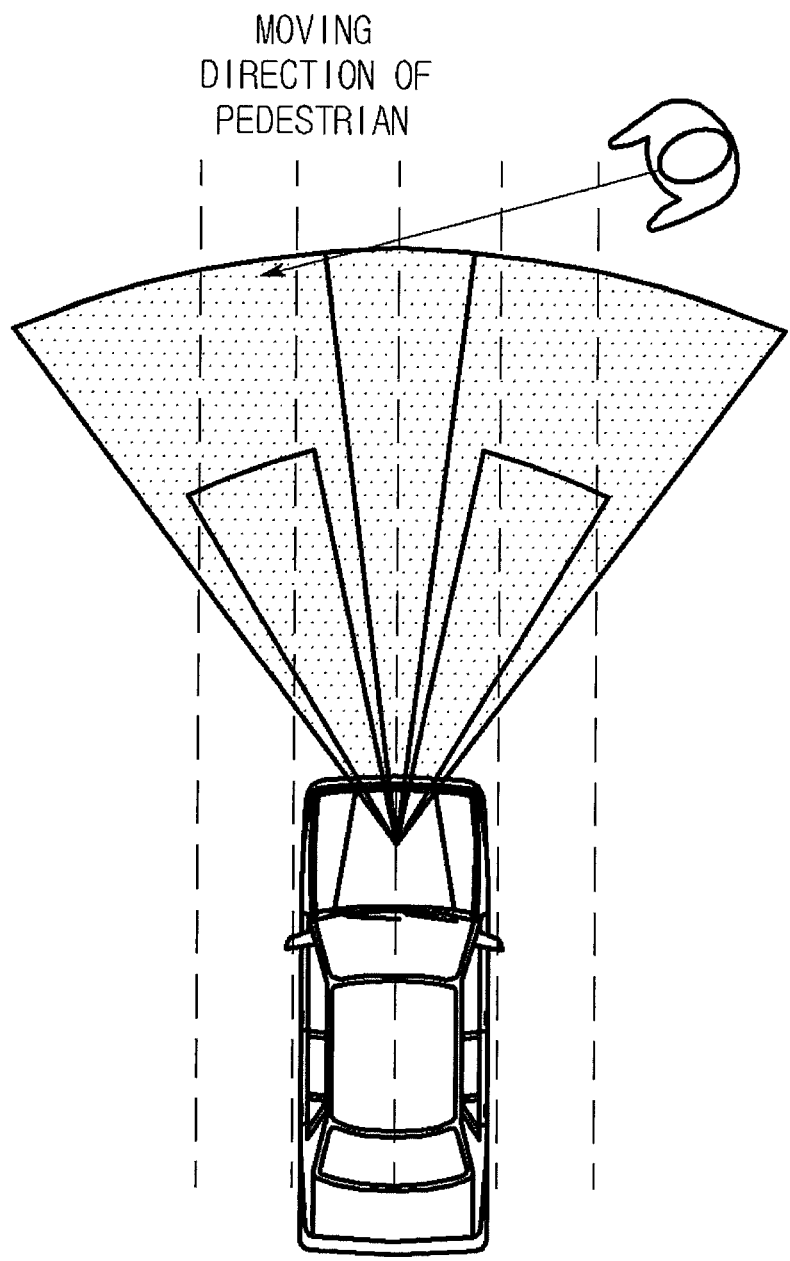

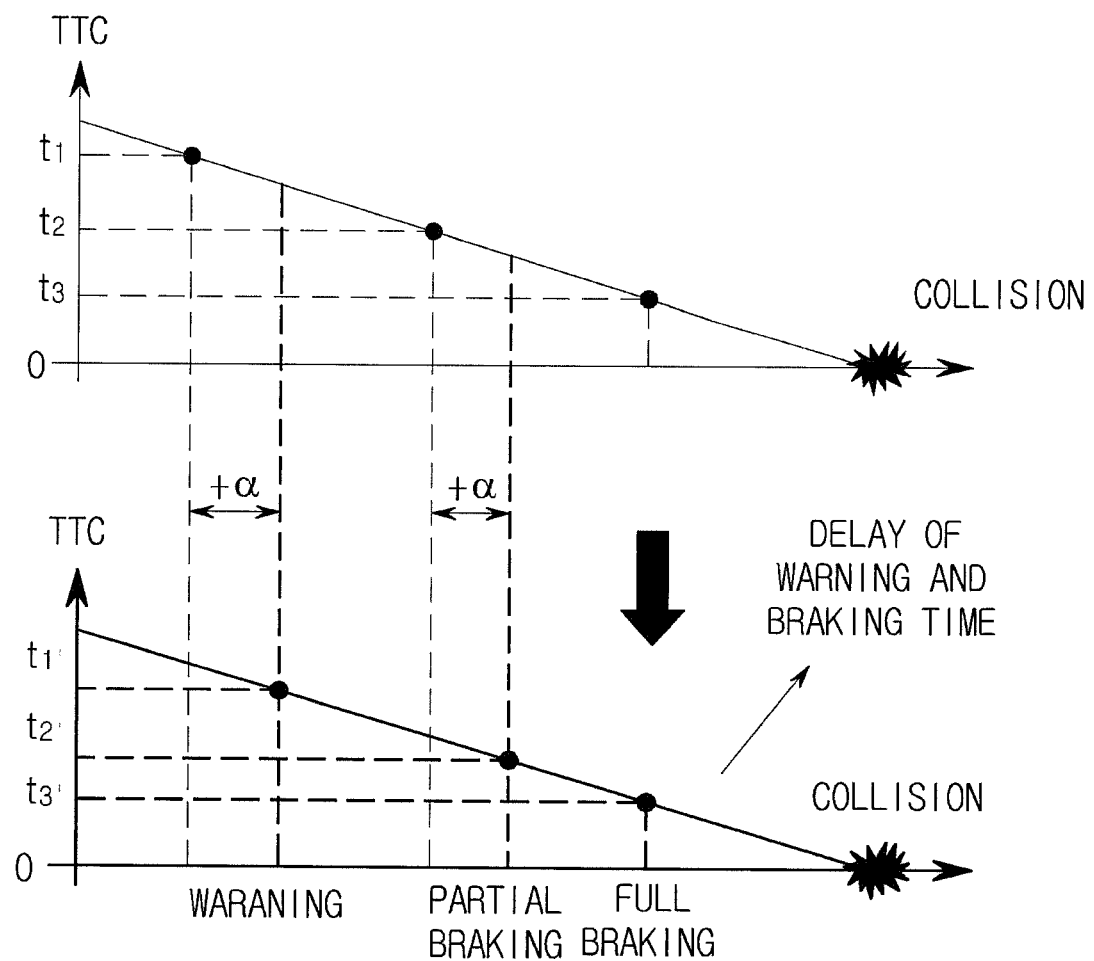
[FIG. 9C]

[FIG. 9D]
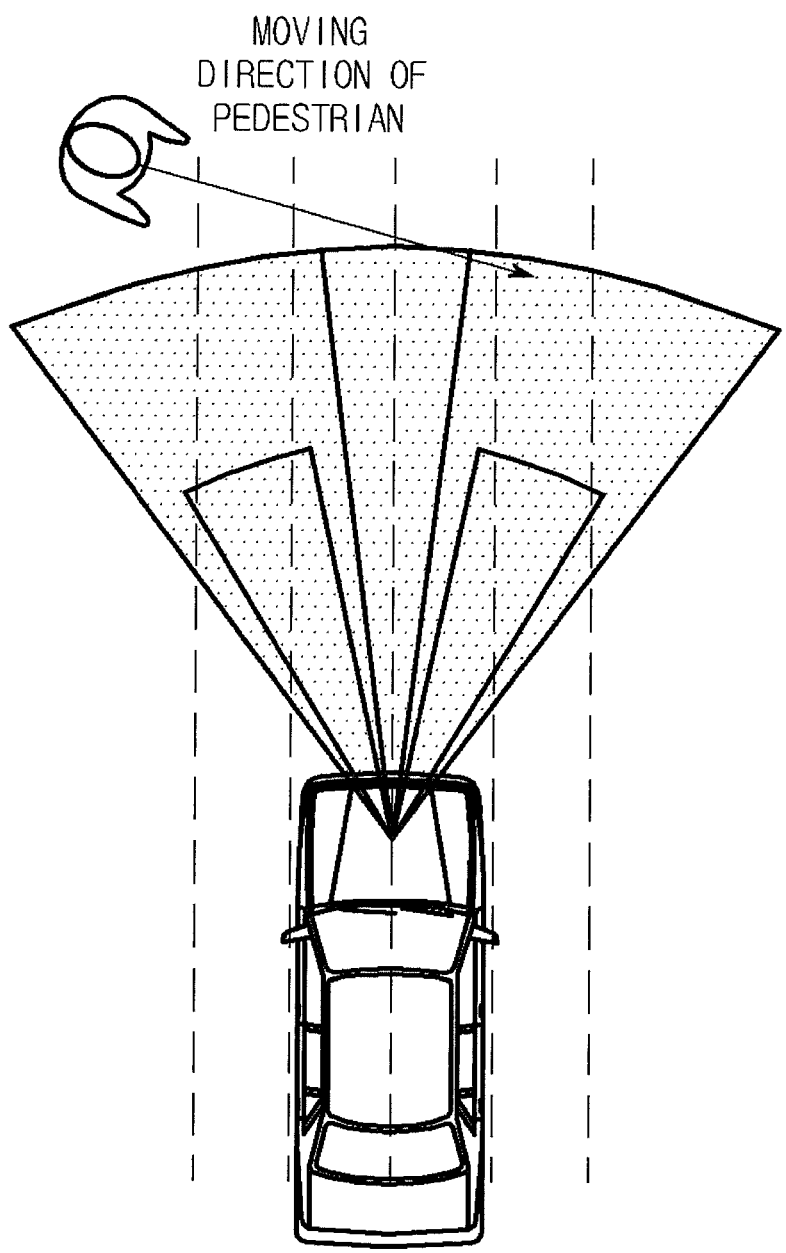

[FIG. 10A]
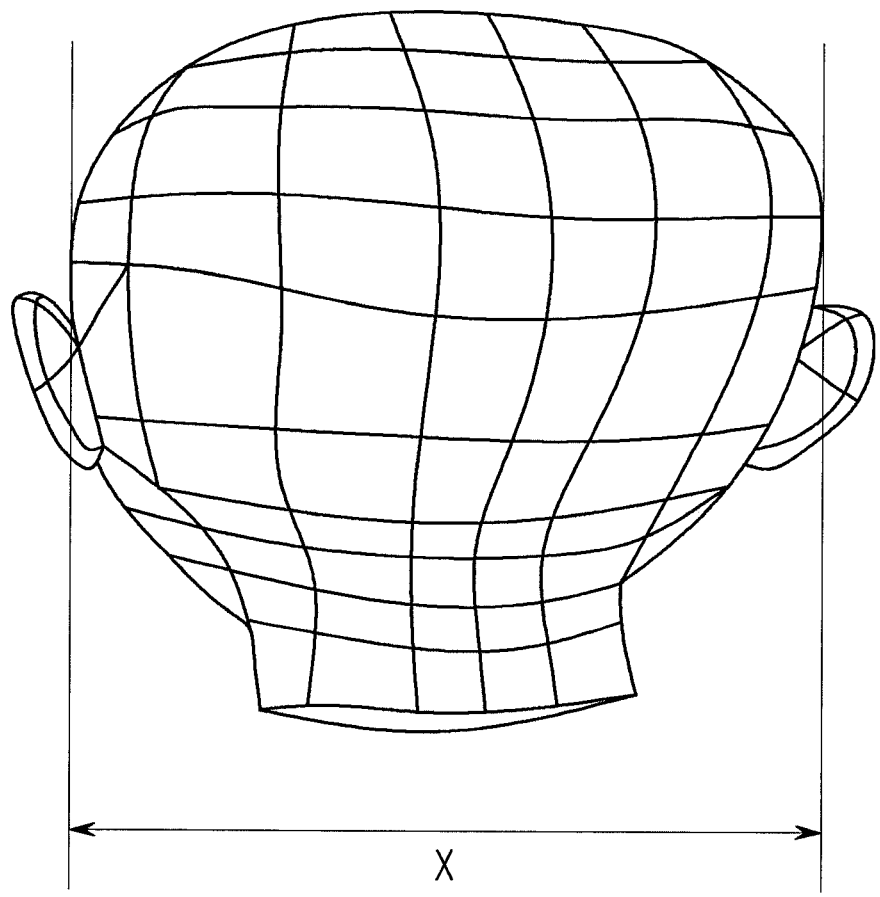

[FIG. 10B]
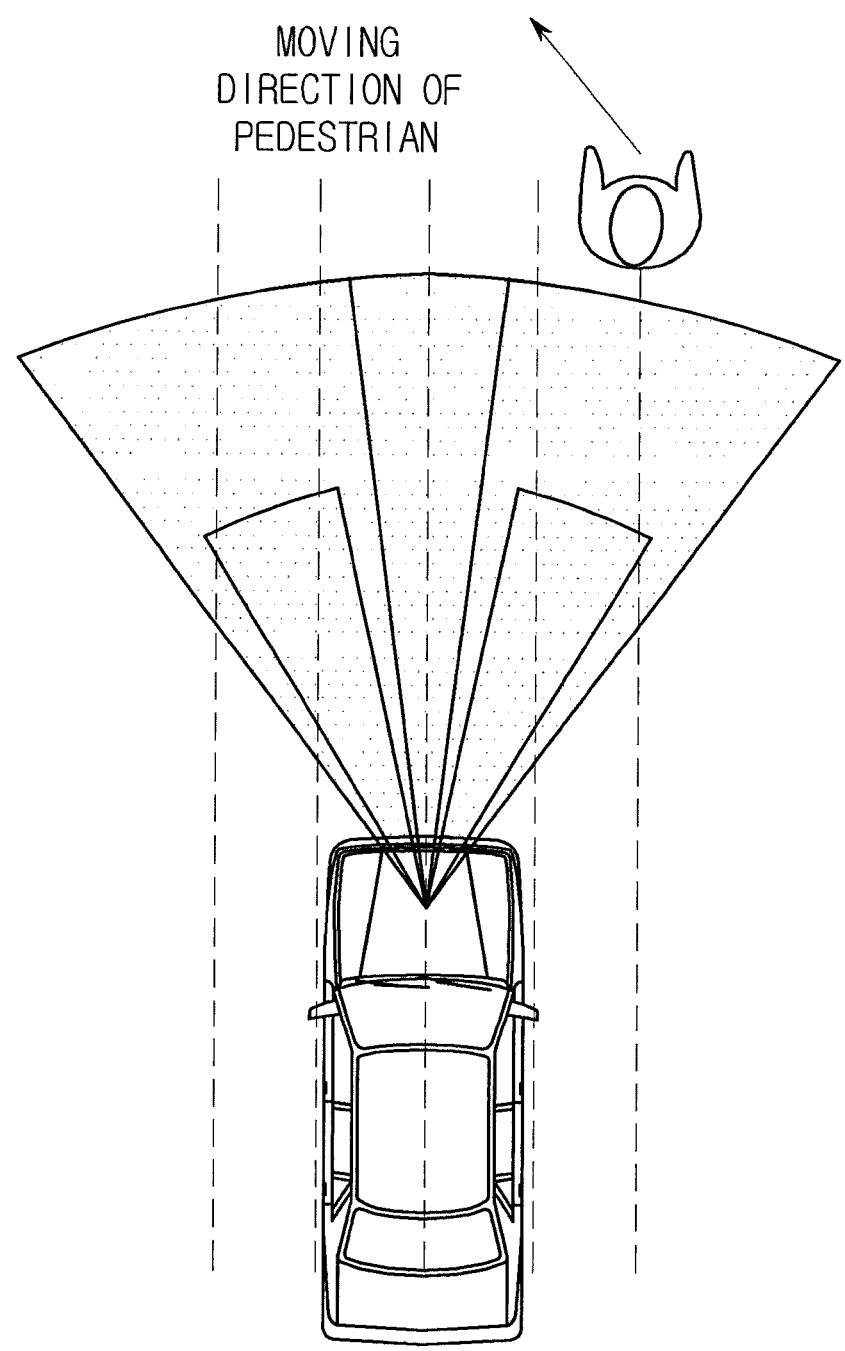

[FIG. 10C]
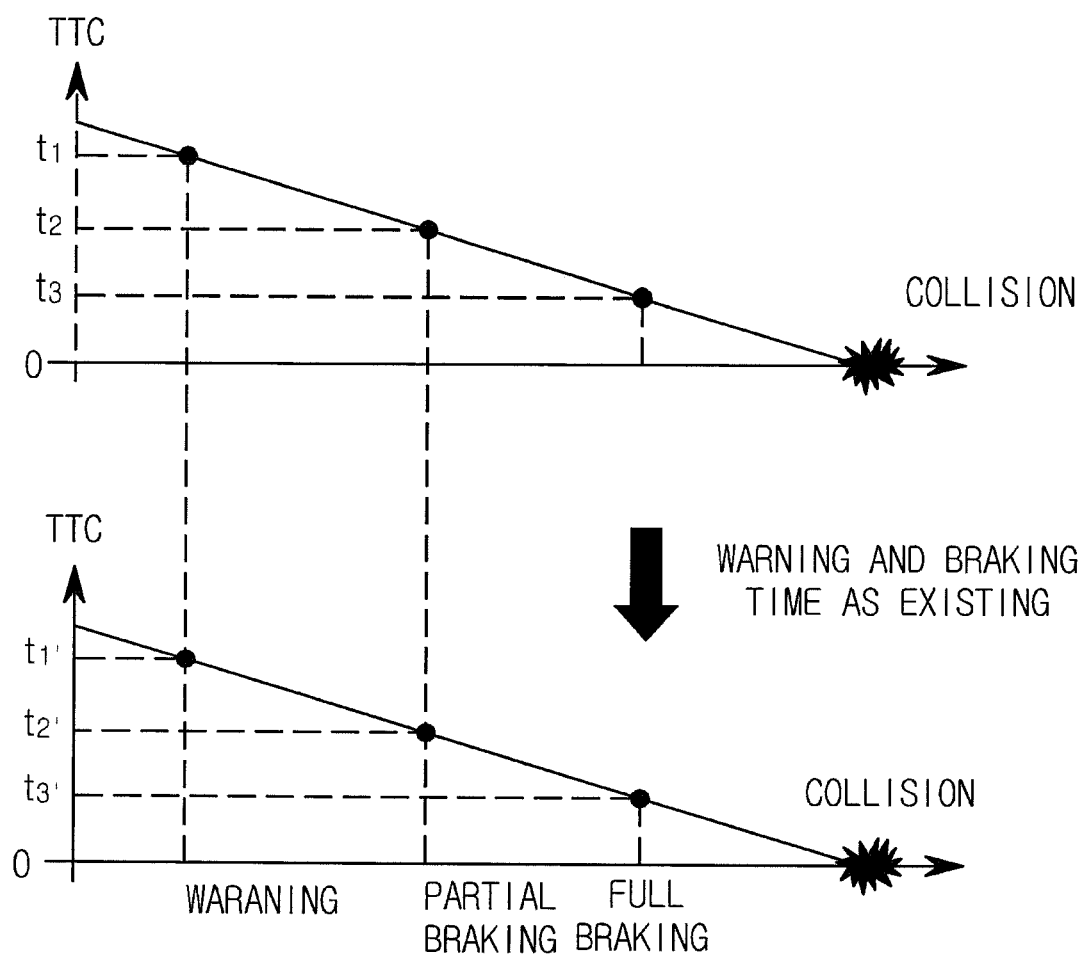

[FIG. 11A]
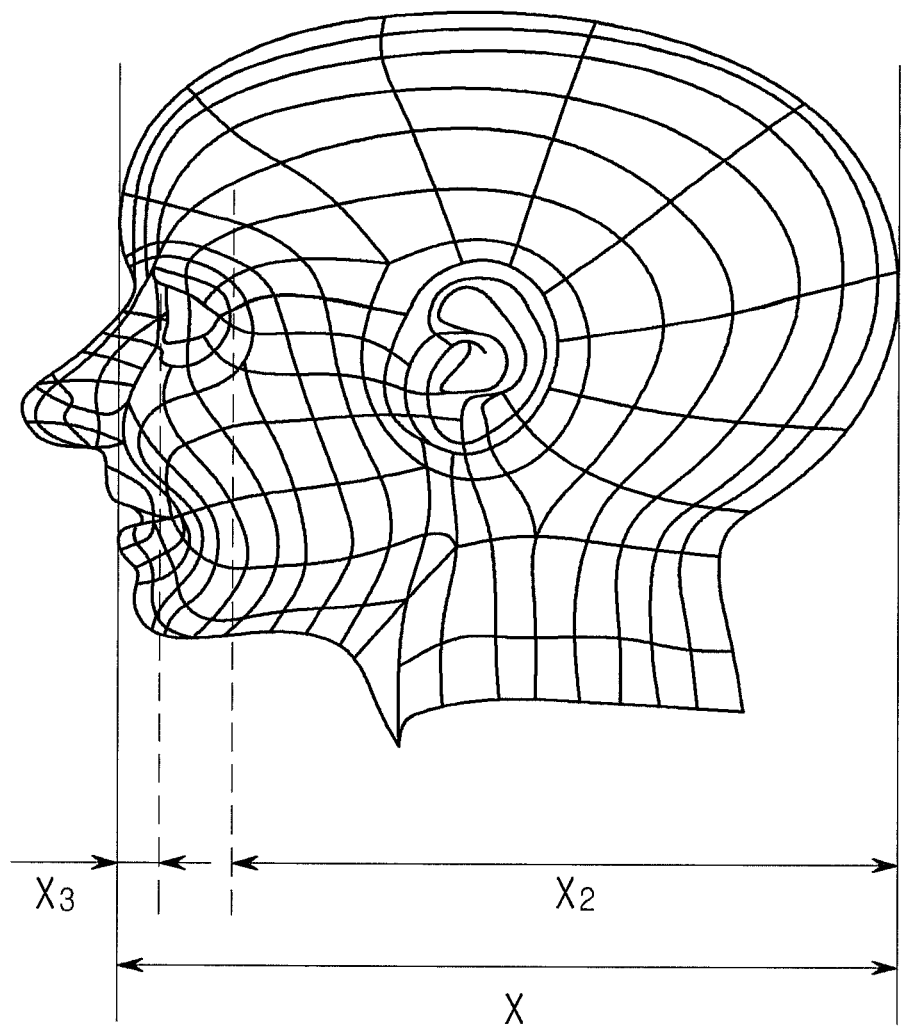

[FIG. 11B]
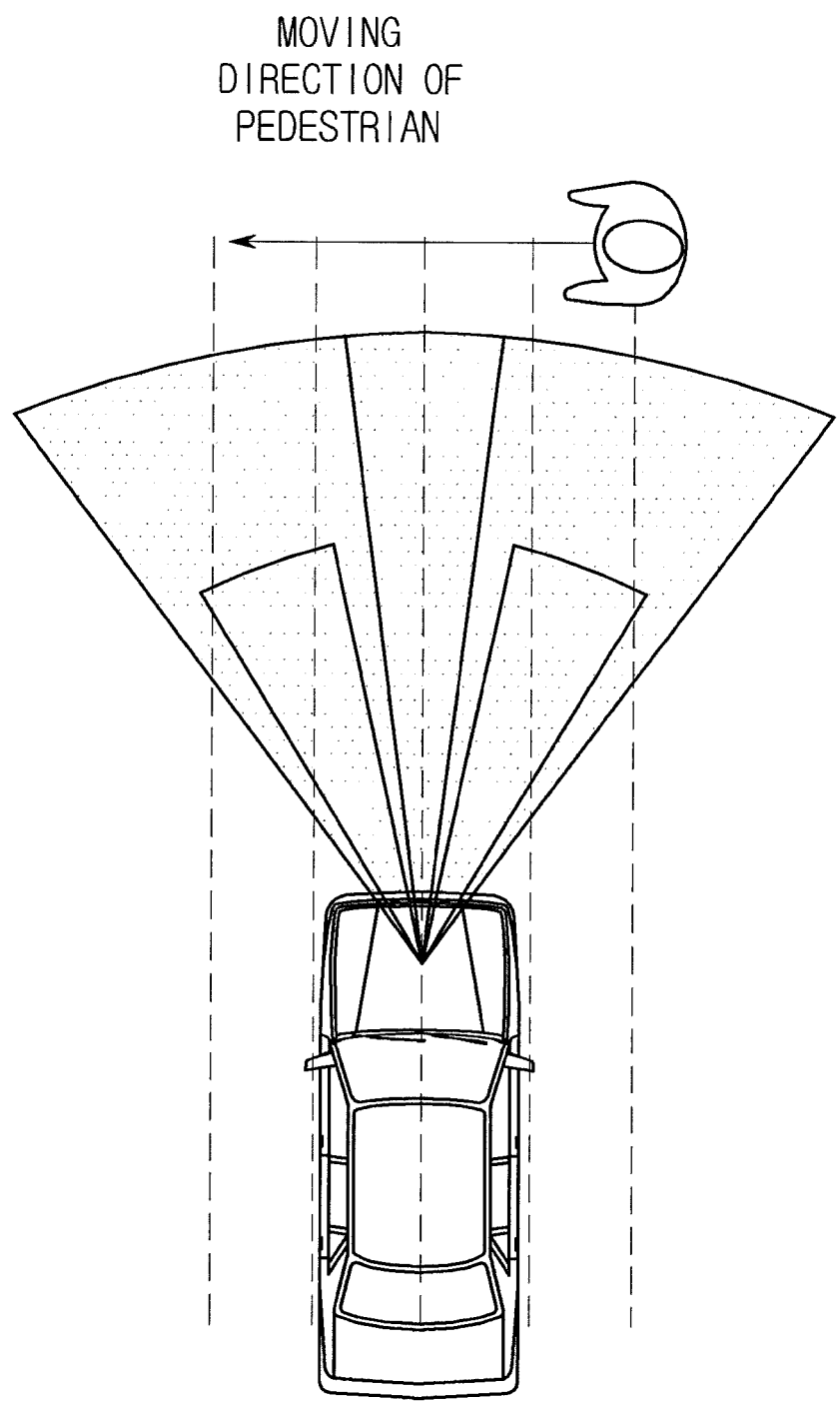

[FIG. 11C]
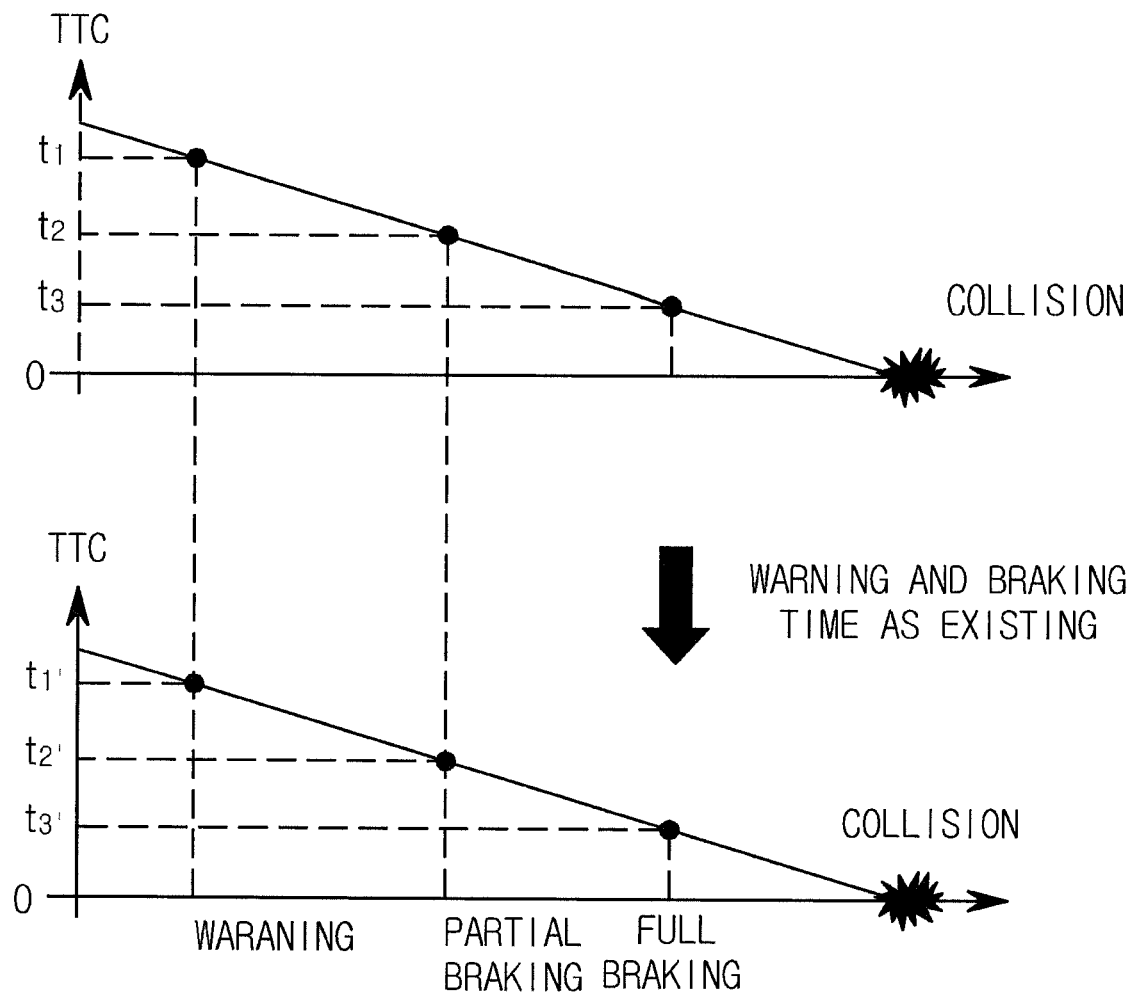

[FIG. 12]
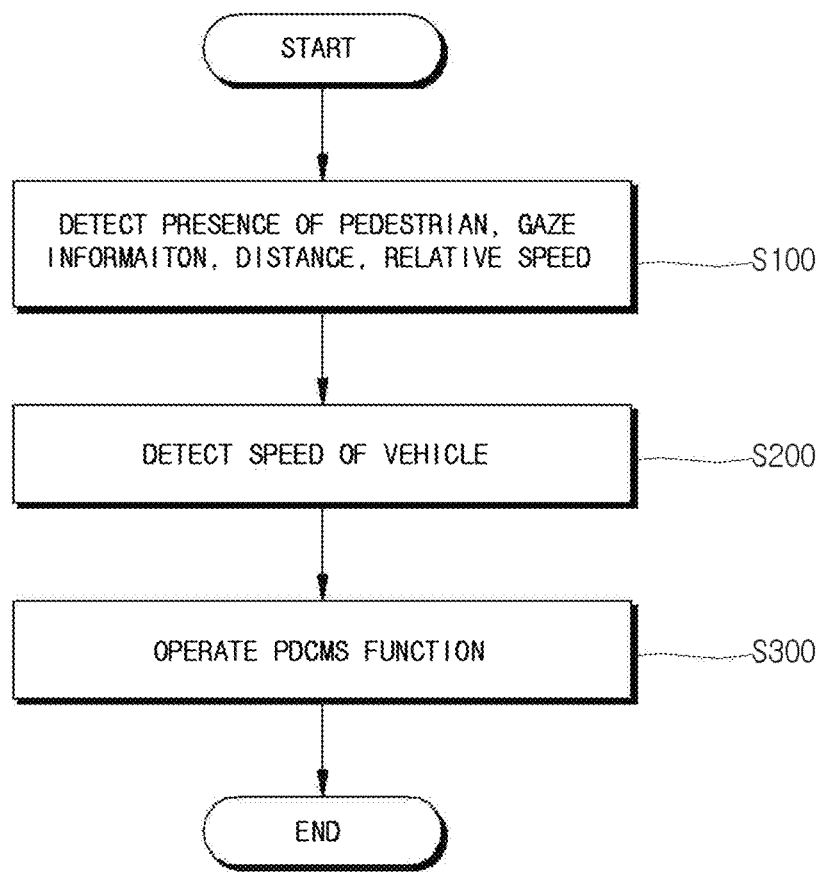

PEDESTRIAN COLLISION PREVENTION APPARATUS AND METHOD CONSIDERING PEDESTRIAN GAZE

CROSS-REFERENCE TO RELATED APPLICATION

This application claims the benefit of priority to Korean Patent Application No. 10-2016-0184288, filed on Dec. 30, 2016, the disclosure of which is incorporated herein by reference in its entirety.

TECHNICAL FIELD

The present disclosure relates to a pedestrian collision prevention apparatus and a method, and more particularly, to an apparatus and a method for activating a pedestrian detection and collision mitigation system (PDCMS) of a vehicle capable of protecting a pedestrian by activating a PDCMS function when an accident is highly likely to occur by recognizing the pedestrian and considering a gaze direction of the pedestrian.

BACKGROUND

Recently, advanced driver assistance systems (ADAS) are being developed to assist driving of a driver. The ADAS has multiple sub-technology categories. Among those, the ADAS includes a pedestrian detection and collision mitigation system (PDCMS).

The PDCMS is a technology that warns a driver of a pedestrian collision when a collision of a pedestrian with a vehicle is expected and automatically activates an emergency brake.

Lethality and injury rates of pedestrian-related traffic accidents are so high, which leads to a lot of life loss. The PDCMS system may help reduce a speed of the vehicle against inevitable pedestrian collisions, thereby alleviating pedestrian impacts and reducing the lethality and the injury rates.

Therefore, a technology development for specific application of the PDCMS has been required.

SUMMARY

An object of the present disclosure is to provide an apparatus for activating a pedestrian detection and collision mitigation system (PDCMS) including a front detection sensor capable of detecting a possibility of collision with a pedestrian with higher accuracy by considering a gaze direction of the pedestrian.

Another object of the present disclosure is to provide a system for more safely protecting a pedestrian by accurately activating a PDCMS function.

Other objects and advantages of the present disclosure can be understood by the following description, and become apparent with reference to the embodiments of the present disclosure. Also, it is obvious to those skilled in the art to which the present disclosure pertains that the objects and advantages of the present disclosure can be realized by the means as claimed and combinations thereof.

In accordance with one aspect of the present disclosure, an apparatus for activating a pedestrian detection and collision mitigation system (PDCMS) of a vehicle includes: a front detection sensor detecting a presence of a pedestrian on a driving lane of the vehicle, gaze information of the pedestrian, and a distance and a relative speed between the pedestrian and the vehicle; a vehicle sensor detecting at least any one of a speed, an acceleration, a steering angle, a steering angular velocity, and a pressure of a master cylinder of the vehicle; an electronic control unit activating a PDCMS function based on information detected by the front detection sensor and the vehicle sensor; and a warning unit operated to inform a driver of a collision of the pedestrian with the vehicle by a control of the electronic control unit, in which the PDCMS function may include activating an operation of the warning unit and activating an operation of a brake regardless of whether the driver operates the brake and the activation of the operation of the warning unit and the activation of the operation of the brake may be performed in order of the operation of the warning unit, a partial braking of the vehicle, and a full braking of the vehicle.

The front detection sensor may be configured of at least any one of a camera, a radar, and a Lidar.

When a horizontal length of the entire face of the pedestrian is defined as x, a horizontal length from a left face contour to a left eye of the pedestrian is defined as $x_1$, a horizontal length from a right face contour to a right eye of the pedestrian is defined as $x_2$, and a horizontal length between the left eye and the right eye of the pedestrian is defined as $x_3$, the gaze information of the pedestrian may correspond to a front or a diagonal if $|(x_1-x_2)/x|<a$, a rear if $x_1=x_2=x_3=0$, and a side if $|(x_1-x_2)/x|\geq a$ or $x_1=0$ or $x_2=0$, and the a may be selected in a range between 0.65 and 0.95.

The electronic control unit may perform the activation of the operation of the warning unit and the activation of the operation of the brake by delaying the activation of the operation of the warning unit and the activation of the operation of the brake by a predetermined time when the gaze information of the pedestrian is the front or the diagonal, compared to when the gaze information of the pedestrian is the rear or the side.

The vehicle sensor may further include at least any one of a rain sensor, a temperature sensor, and an illumination sensor.

The electronic control unit may perform the activation of the operation of the brake so that the speed of the vehicle is reduced to at least a predetermined speed or more from time when the operation of the brake is activated to time when the collision of the pedestrian with the vehicle occurs.

The electronic control unit may permit the driver to operate the brake for a maximum possible deceleration even after the activation of the operation of the brake starts.

The electronic control unit may control the warning unit to inform the driver that the PDCMS function is in an available state.

The warning unit may include a display unit visually informing the collision of the pedestrian with the vehicle or a speaker unit audibly informing the collision of the pedestrian with the vehicle.

The PDCMS function may further include an operation of a rear brake lamp.

The PDCMS function may further include an operation of an electrical stability control (ESC).

In accordance with another aspect of the present disclosure, a method for activating a pedestrian detection and collision mitigation system (PDCMS) of a vehicle includes: detecting pedestrian information including a presence of a pedestrian on a driving lane of the vehicle, gaze information of the pedestrian, and a distance and a relative speed between the pedestrian and the vehicle; detecting vehicle information including at least any one of a speed, an acceleration, a steering angle, a steering angular velocity, or a pressure of a master cylinder of the vehicle; and activating a PDCMS function based on the pedestrian information and the vehicle information, in which the PDCMS function may include activating an operation of a warning unit operated to inform a driver of a collision of the pedestrian with the vehicle and activating an operation of a brake regardless of whether the driver operates the brake, and the activation of the operation of the warning unit and the activation of the operation of the brake may be performed in order of the operation of the warning unit, a partial braking of the vehicle, and a full braking of the vehicle.

BRIEF DESCRIPTION OF THE DRAWINGS

The above and other objects, features and other advantages of the present disclosure will be more clearly understood from the following detailed description taken in conjunction with the accompanying drawings, in which:

FIG. 1 is a diagram illustrating a schematic concept of a pedestrian detection and collision mitigation system (PDCMS);

FIG. 2 is a block diagram illustrating a change in a PDCMS state according to a vehicle;

FIG. 3 is a block diagram schematically illustrating an apparatus for activating a PDCMS of a vehicle according to an embodiment of the present disclosure;

FIG. 4 is an exemplified view for identifying gaze information of a front detection sensor according to an embodiment of the present disclosure;

FIG. 5 is a diagram illustrating a concept of a pedestrian moving speed;

FIG. 6 is a diagram illustrating an example of a mapping table for activating a PDCMS function according to the embodiment of the present disclosure;

FIG. 7 is a diagram illustrating an example of an operation of a PDCMS function according to an embodiment of the present disclosure;

FIGS. 8A-8C are exemplified views illustrating the operation of the PDCMS function when the gaze information is the front according to the embodiment of the present disclosure;

FIGS. 9A-9D are exemplified views illustrating the operation of the PDCMS function when the gaze information is the diagonal according to the embodiment of the present disclosure;

FIGS. 10A-10C is an exemplified view illustrating the operation of the PDCMS function when the gaze information is the rear according to the embodiment of the present disclosure;

FIGS. 11A-11C are exemplified views illustrating the operation of the PDCMS function when the gaze information is the side according to the embodiment of the present disclosure; and FIG. 12 is a flow chart illustrating a flow of a method for activating a PDCMS function according to an embodiment of the present disclosure.

DETAILED DESCRIPTION OF SPECIFIC EMBODIMENTS

Hereinafter, exemplary embodiments of the present disclosure will be described in detail with reference to the accompanying drawings so that those skilled in the art may easily practice the present disclosure. As those skilled in the art would realize, the described embodiments may be modified in various different ways, all without departing from the spirit or scope of the present disclosure.

A part irrelevant to the description will be omitted to clearly describe the present disclosure, and the same elements will be designated by the same reference numerals throughout the specification.

Throughout the present specification, when any one part is referred to as being "connected to" another part, it means that any one part and another part are "directly connected to" each other or are "electrically connected to" each other with the other part interposed therebetween. Further, unless explicitly described to the contrary, "comprising" any components will be understood to imply the inclusion of other components rather than the exclusion of any other components.

The mention that any portion is present "over" another portion means that any portion may be directly formed on another portion or a third portion may be interposed between one portion and another portion. In contrast, the mention that any portion is present "just over" another portion means that a third portion may not be interposed between one portion and another portion.

Terms used throughout the specification, 'first', 'second', 'third', etc. may be used to describe various portions, components, regions, layers, and/or sections but are not limited thereto. These terms are used only to differentiate any portion, component, region, layer, or section from other portions, components, regions, layers, or sections. Therefore, a first portion, component, region, layer, or section which will be described below may be mentioned as a second portion, component, region, layer, or section without departing from the scope of the present disclosure.

Terminologies used herein are to mention only a specific exemplary embodiment, and does not limit the present disclosure. Singular forms used herein include plural forms as long as phrases do not clearly indicate an opposite meaning. A term "including" used in the present specification concretely indicates specific properties, regions, integer numbers, steps, operations, elements, and/or components, and is not to exclude presence or addition of other specific properties, regions, integer numbers, steps, operations, elements, components, and/or a group thereof.

The term expressing the relative space of "under", "over", and the like may be used to more easily describe the relationship between other portions of one portion which is illustrated in the drawings. The terms intend to include other meanings or operations of apparatuses which are being used along with the intended meaning in the drawings. For example, overturning the apparatus in the drawings, any portions described as being positioned "under" other portions will be described as being positioned "over" other portions. Therefore, the exemplified term "under" includes both of the up and down directions. An apparatus may rotate by 90° or may rotate at different angles and the term expressing a relative space is interpreted accordingly.

All terms including technical terms and scientific terms used herein have the same meaning as the meaning generally understood by those skilled in the art to which the present disclosure pertains unless defined otherwise. Terms defined in a generally used dictionary are additionally interpreted as having the meaning matched to the related art document and the currently disclosed contents and are not interpreted as ideal or formal meaning unless defined.

FIG. 1 is a diagram illustrating a schematic concept of a pedestrian detection and collision mitigation system (PDCMS).

The PDCMS is a technology that warns a driver of a pedestrian collision when a collision of a pedestrian with a vehicle is expected and automatically activates an emergency brake.

Referring to FIG. 1, it is determined whether the PDCMS is operated based on an operation determination of a pedestrian and an operation determination of a vehicle. When the operation of the PDCMS is determined, the PDCMS function is performed by issuing a warning to driver and activating a vehicle control.

A system designer may design the PDCMS function to operate solely in the risk of collision of a pedestrian with a vehicle or may design the PDCMS function to operate in combination with other driving assistance systems.

FIG. 2 is a block diagram illustrating a change in a PDCMS state according to a vehicle.

In a PDCMS off state, no action is taken on the operation of the vehicle. The PDCMS off state is produced when an engine of a vehicle stalls.

In the PDCMS deactivation state, the apparatus for activating a PDCMS monitors a speed of a vehicle and determine whether the PDCMS is in an appropriate state to activate. The PDCMS deactivation state is produced by turning on the engine in the PDCMS off state. Further, the PDCMS deactivation state is produced even when the vehicle is in a state other than the conditions that the vehicle is activated from the PDCMS activation state. For example, when the speed of the vehicle falls below a predetermined value Vmin, the PDCMS deactivation state is produced.

The PDCMS activation state is produced when the speed of the vehicle is equal to or greater than the predetermined value Vmin and equal to or less than a predetermined value Vmax. To determine whether to operate the PDCMS function in the PDCMS activation state, an operation of a pedestrian and an operation of a vehicle are monitored. When the apparatus for activating a PDCMS determines that the PDCMS function needs to be operated, the PDCMS function starts. The PDCMS function includes a collision warning to a driver and an operation of an emergency brake or optionally includes braking actions by a driver.

FIG. 3 is a block diagram schematically illustrating an apparatus for activating a PDCMS of a vehicle according to an embodiment of the present disclosure;

Referring to FIG. 3, an apparatus 100 for activating a PDCMS of a vehicle according to an embodiment of the present disclosure includes a front detection sensor 200, a vehicle sensor 300, an electronic control unit 400, and a warning unit 500.

The front detection sensor 200 is a sensor for detecting various objects in front of a vehicle and may be configured of at least any one of a camera, a radar, and a Lidar. The front detection sensor 200 may extract characteristics of obstacles detected in front of the vehicle to identify objects and detect various objects such as vehicles on a roadside as well as pedestrians. The front detection sensor 200 may detect even parts configuring a pedestrian as well as the overall appearance of the pedestrian to detect the pedestrian even when only a part of the pedestrian covered by various objects such as vehicles on a roadside is detected. Further, the front detection sensor 200 may detect gaze information of a pedestrian when an object in front of the vehicle is determined as the pedestrian. The front detection sensor 200 transmits the detected information on the pedestrian to the electronic control unit 400.

The vehicle sensor 300 measures revolutions per minute (RPM) of a vehicle wheel from a vehicle engine and calculates a driving speed of a vehicle based on the known circumference of the wheel and the measured RPM and time. Further, the vehicle sensor 300 may detect information on driving conditions of a vehicle such as an acceleration, a steering angle, a steering angular speed, and a pressure of a master cylinder. Further, the vehicle sensor 300 may also detect information on driving environment of a vehicle by including a rain sensor, a temperature sensor, an illuminance sensor, etc. The vehicle sensor 300 may transmit the information on the detected driving conditions and driving environment of the vehicle to the electronic control unit 400.

The electronic control unit 400 determines whether to operate the PDCMS function of the vehicle based on the information received from the front detection sensor 200 and the vehicle sensor 300. Specifically, the electronic control unit 400 determines whether the conditions that the PDCMS function may be operated are satisfied by combining the pedestrian state and the vehicle state. That is, the electronic control unit 400 determines the risk of collision between a vehicle and a pedestrian using a current position of the pedestrian, a current position of the vehicle, and speed information on the vehicle if it is determined that an obstacle is the pedestrian. For example, if the distance between the pedestrian and the vehicle is below a predetermined distance and the motion direction of the pedestrian is the same as the movement direction of the vehicle, it is determined that the conditions that the PDCMS function may be operated are satisfied because the collision is highly likely to occur and if the distance between the pedestrian and the vehicle is below a predetermined distance but the motion direction of the pedestrian differs from the movement direction of the vehicle, it is determined that the conditions that the PDCMS function may be operated are not satisfied because the collision is less likely to occur.

Preferably, the electronic control unit 400 determines whether the conditions that the PDCMS function may be operated are satisfied based on the mapping table. The mapping table will be described below with reference to FIG. 6.

If the electronic control unit 400 determines that the pedestrian state and the vehicle state satisfy the conditions that the PDCMS function may start, the PDCMS function of the vehicle is operated. The PDCMS function includes operating the warning unit 500 to warn the driver of the collision of the pedestrian with the vehicle or operating the brake without the operation of the driver.

Warning the driver of the collision of the pedestrian with the vehicle is performed by operating the warning unit 500. The warning unit 500 is operated by the control of the electronic control unit 400. The warning unit 500 may include a display or a speaker. The display included in the warning unit 500 may provide a driver with a visual warning through a head-up display, a navigation display, etc. The speaker included in the warning unit 500 may provide a driver with an audible warning through an audio. The content of the warning that the warning unit 500 performs is that there is a potential risk of collision of the pedestrian with the vehicle since obstacles exist in the front of a driving lane of the vehicle.

The activation of the operation of the brake regardless of whether the driver operates the brake is performed only by the control of the electronic control unit 400 without the operation of the driver. The activation of the operation of the brake is to automatically reduce the relative speed between the vehicle and the pedestrian if it is found that the pedestrian collision is just around the corner.

The activation of the operation of the brake is performed so that the speed of the vehicle may be reduced to at least a predetermined speed or more from the time when the operation of the brake is activated to the time when the collision of the pedestrian with the vehicle occurs. Preferably, the predetermined speed may be 20 km/h.

Further, even after the activation of the operation of the brake starts, the driver manually operates the brake, thereby performing the maximum possible deceleration. That is, the driver may manually operate the brake so that the speed of the vehicle is reduced more than the predetermined speed. For example, the driver may manually operate the brake so that the speed of the vehicle is maximally decelerated to 20 km/h or more that is the predetermined speed.

In addition, the electronic control unit 400 may inform a driver that the PDCMS function is in an available state. Specifically, the electronic control unit 400 may control the warning unit 500 to inform the driver that the PDCMS function is in the available state through the display unit or the speaker unit of the warning unit 500.

In addition, the PDCMS function may control an operation of a brake lamp to prevent the potential risk of collision with the following vehicles.

In addition, the PDCMS function may further include an operation of an electrical stability control (ESC). The ESC is an apparatus that allows a vehicle itself to intervene in an operation of a brake in an emergency situation such as an oversteer (when a vehicle enters inwardly beyond a turning radius of a road) or an understeer (when a vehicle deviates outwardly beyond the turning radius of the road) of a vehicle to thereby help a driver to escape from an emergency situation.

FIG. 4 is an exemplified view for identifying gaze information of a front detection sensor according to an embodiment of the present disclosure.

The front detection sensor 200 according to the embodiment of the present disclosure may detect the gaze information of the pedestrian and reflect the detected gaze information to the operation of the PDCMS of the electronic control unit 400.

In order to detect the gaze information of the pedestrian, the front detection sensor 200 sets a horizontal length of the entire face of the pedestrian to be x, a horizontal length from a left face contour to a left eye to be $x_1$, a horizontal length from a right face contour to a right eye to be $x_2$, and a horizontal length between the left eye and the right eye to be $x_3$ and then detects the gaze information of the pedestrian.

Specifically, the gaze information of the pedestrian corresponds to the front or the diagonal if $|(x_1-x_2)/x|<a$, the rear if $x_1=x_2=x_3=0$, and the side if $|(x_1-x_2)/x|\geq a$ or $x_1=0$ or $x_2=0$, in which the a may be selected in the range between 0.65 and 0.95.

The front detection sensor 200 transmits the detected gaze information of the pedestrian to the electronic control unit 400. The method for reflecting the gaze information of the pedestrian received by the electronic control unit 400 to the operation of the PDCMS will be described with reference to FIGS. 8 to 11.

FIG. 5 is a diagram illustrating a concept of a pedestrian moving speed.

Referring to FIG. 5, the front detection sensor 200 may detect a distance between a pedestrian 600 and a vehicle 700 that are moving on a driving lane and a moving speed of the pedestrian 600.

For example, if the pedestrian 600 moves from the left to the right with respect to a front view of the vehicle 700, the pedestrian 600 has a negative (−) moving speed and if the pedestrian 600 moves from the right to left with respect to the front view of the vehicle 700, the pedestrian 600 has a positive (+) moving speed.

In addition, the front detection sensor 200 may detect the distance between the vehicle 700 and the pedestrian 600 moving on the driving lane of the vehicle.

FIG. 6 is a diagram illustrating an example of a mapping table for activating a PDCMS function according to the embodiment of the present disclosure.

The electronic control unit 400 uses the mapping table to determine the risk of collision of the pedestrian with the vehicle, and furthermore, whether the PDCMS function is operated.

Referring to FIG. 6, the electronic control unit 400 determines the operation of the PDCMS function based on an initial speed at a boundary of a driving lane on which the pedestrian moves and an initial speed of the vehicle.

Specifically, if an absolute value of the initial speed at the boundary of the driving lane on which the pedestrian is moving and the initial speed of the vehicle are in an area in which the PDCMS function is essentially operated at the time of determining whether the PDCMS function is operated, the electronic control unit 400 determines that the PDCMS function is operated. The operation possible area means the area in which the Vmin or the Vmax may be adjusted according to the selection of the manufacturer.

For example, if the speed of the vehicle falls below 8.4 m/s (30 km/h) as the Vmin or rises above 16.6 m/s (60 km/h) as the Vmax, then the electronic control unit 400 may determine that the PDCMS is in the deactivation state and thus the PDCMS function is not operated.

Further, when the initial speed of the vehicle is between the Vmin and the Vmax and the absolute value of the initial speed at the boundary of the driving lane on which the pedestrian moves is between 0.83 m/s and 1.5 m/s, the electronic control unit 400 may determine that the PDCMS function is operated.

FIG. 7 is a diagram illustrating an example of an operation of a PDCMS function according to an embodiment of the present disclosure. A vertical axis represents the TTC derived from the distance and the relative speed between the vehicle and the pedestrian and a horizontal axis represents the operation of the PDCMS function of the vehicle.

The electronic control unit 400 performs the PDCMS operation by steps according to the distance between the vehicle and the pedestrian.

That is, when $t_1>t_2>t_3$ for $t_1$, $t_2$, and $t_3$ which are different TTCs, if the TTC of the vehicle and the pedestrian is $t_1$, the warning is issued to the driver through the warning unit 500, if the TTC of the vehicle and the pedestrian is $t_2$, the vehicle is partially braked, and if the TTC of the vehicle and the pedestrian is $t_3$, the vehicle is fully braked.

The warning of the warning unit 500 may include the visual warning through the display unit or the audible warning through the speaker unit.

The partial braking means reducing the speed of the vehicle to at least a predetermined speed or more and the full braking means maximally reducing the speed of the vehicle.

However, even after the PDCMS function is operated, the driver may manually operate the brake to perform the maximum possible deceleration. That is, the driver may manually operate the brake to reduce the speed of the vehicle more than the sequential deceleration according to the PDCMS function.

FIGS. 8 to 11 illustrate the method for applying the gaze information of the pedestrian received from the front-side sensor 200 to the operation of the PDCMS function for performing the sequential deceleration of the electronic control unit 400.

When the pedestrian recognizes the driving direction of the vehicle, the pedestrian is less likely to move to the inside of the route of the vehicle is low and the possibility of collision is reduced accordingly. However, when the gaze direction of the pedestrian is not taken into consideration, the gaze of the pedestrian is directed toward the front of the vehicle, and therefore it is likely to activate the warning and the operation of the brake due to the unnecessary operation of the PDCMS function even in the situation that the pedestrian recognizes the driving direction of the vehicle and the possibility of collision is low.

The unnecessary operation of the PDCMS function causes the driver to experience the sense of difference and the discomfort. This is directly connected to the commerciality of the vehicle, which is a big problem for car makers.

Therefore, if the possibility of collision is determined according to the gaze direction of the pedestrian and the operating time of the PDCMS function is controlled, the essential purpose of the PDCMS for protecting the pedestrian may be achieved and the reduction in the ride comfort of the driver may be prevented.

FIGS. 8A-8C are exemplified views illustrating the operation of the PDCMS function when the gaze information is the front according to the embodiment of the present disclosure.

As described above with reference to FIG. 4, the horizontal length of the entire face of the pedestrian is x, the horizontal length from the left face contour to the left eye is defined as $x_1$, the horizontal length from the right face contour to the right eye is defined as $x_2$, the horizontal length between the left eye and the right eye is defined as $x_3$.

If the gaze of the pedestrian is directed toward the front of the vehicle, it corresponds to the case where $|(x_1-x_2)/x|<a$. Therefore, if it corresponds to $|(x_1-x_2)/x|<a$ based on the lengths of each part of the face of the pedestrian derived from the front detection sensor 200, it may be determined that the gaze of the pedestrian is directed toward the front of the vehicle.

In this case, since the vehicle exists within the view of the pedestrian, it is expected that the possibility of collision is low because the pedestrian recognizes the driving direction of the vehicle. Therefore, the electronic control unit 400 may delay the warning of the driver and the partial braking by a predetermined time from the initially set times $t_1$ and $t_2$ as illustrated in FIG. 7 during the operating time of the PDCMS function. Alternatively, the electronic control unit 400 may delay all of the warning of the driver, the partial braking, and the full braking by a predetermined time from all of the initially set times $t_1$, $t_2$, and $t_3$ as illustrated in FIG. 7 during the operating time of the PDCMS function.

FIGS. 9A-9D are exemplified views illustrating the operation of the PDCMS function when the gaze information is the diagonal according to the embodiment of the present disclosure.

If the gaze of the pedestrian is directed toward the diagonal of the vehicle, it corresponds to the case where $|(x_1-x_2)/x|<a$ like the case where the gaze of the pedestrian is the front of the vehicle. Therefore, if the gaze of the pedestrian corresponds to $|(x_1-x_2)/x|<a$ based on the lengths of each part of the face of the pedestrian derived from the front detection sensor 200, it may be determined that the gaze of the pedestrian is directed toward the diagonal of the vehicle.

In this case, since the vehicle exists within the view of the pedestrian, it is expected that the possibility of collision is low because the pedestrian recognizes the driving direction of the vehicle. Therefore, the electronic control unit 400 may delay the warning of the driver and the partial braking by a predetermined time from the initially set times $t_1$ and $t_2$ as illustrated in FIG. 7 during the operating time of the PDCMS function. Alternatively, the electronic control unit 400 may delay all of the warning of the driver, the partial braking, and the full braking by a predetermined time from all of the initially set times $t_1$, $t_2$, and $t_3$ as illustrated in FIG. 7 during the operating time of the PDCMS function.

FIGS. 10A-10C are exemplified views illustrating the operation of the PDCMS function when the gaze information is the rear according to the embodiment of the present disclosure.

If the gaze direction of the pedestrian is in the same direction as the driving direction of the vehicle, that is, if the vehicle is driving toward the rear of the pedestrian, it corresponds to $x_1=x_2=x_3=0$. Therefore, if it corresponds to $|(x_1-x_2)/x|<a$ based on the lengths of each part of the face of the pedestrian derived from the front detection sensor 200, it may be determined that the gaze direction of the pedestrian is the same as the driving direction of the vehicle, that is, the vehicle is driving toward the rear of the vehicle.

In this case, since the vehicle exists within the view of the pedestrian, it is expected that the possibility of collision is high because the pedestrian does not recognize the driving direction of the vehicle. Therefore, the electronic control unit 400 may not delay the operating time of the PDCMS function from the initially set times $t_1$, $t_2$, and $t_3$ as illustrated in FIG. 7.

FIGS. 11A-11C are exemplified views illustrating the operation of the PDCMS function when the gaze information is the side according to the embodiment of the present disclosure.

If the gaze direction of the pedestrian forms about 90° with respect to the driving direction of the vehicle, that is, if the vehicle is driving toward the side of the pedestrian, it corresponds to the case where $|(x_1-x_2)/x|\geq a$ or $x_1=0$ or $x_2=0$. Therefore, if it corresponds to $|(x_1-x_2)/x|\geq a$ or $x_1=0$ or $x_2=0$ based on the lengths of each part of the face of the pedestrian derived from the front detection sensor 200, it may be determined that the gaze direction of the pedestrian forms about 90° with respect to the driving direction of the vehicle, that is, the vehicle is driving toward the side of the vehicle.

In this case, since the possibility that the vehicle does not exist within the view of the pedestrian is significant, it is expected that the possibility of collision is high because the pedestrian does not recognize the driving direction of the vehicle. Therefore, the electronic control unit 400 may not delay the operating time of the PDCMS function from the initially set times $t_1$, $t_2$, and $t_3$ as illustrated in FIG. 7.

FIG. 12 is a flow chart illustrating a flow of a method for activating a PDCMS function according to an embodiment of the present disclosure.

Referring to FIG. 12, a method of activating a pedestrian detection and collision mitigation system (PDCMS) function of an vehicle according to an embodiment of the present disclosure includes detecting pedestrian information including a presence of a pedestrian on a driving lane of the vehicle, gaze information of the pedestrian, and a distance and a relative speed between the pedestrian and the vehicle (S100), detecting vehicle information including at least one of a speed, an acceleration, a steering angular velocity, a pressure of a master cylinder of the vehicle (S200), and operating the PDCMS function based on the pedestrian information and the vehicle information (S300).

In the detecting of the pedestrian information including the presence of the pedestrian on the driving lane of the vehicle, the gaze information of the pedestrian, and the distance and the relative speed between the pedestrian and the vehicle (S100), the pedestrian information may be detected by at least any one of the camera, the radar, and the Lidar.

In the detecting of the vehicle information including at least one of the speed, the acceleration, the steering angular velocity, the pressure of the master cylinder of the vehicle (S200), the RPM of the vehicle wheel is measured from the vehicle engine and the driving speed of the vehicle is calculated based on the known circumference of the wheel and the measured RPM and time. Further, it is possible to determine whether the brake pedal is operated.

In the operating of the PDCMS function based on the pedestrian information and the vehicle information (S300), the PDCMS function is operated based on the information detected by the front detection sensor and the vehicle sensor. Specifically, in the operating of the PDCMS function based on the pedestrian information and the vehicle information (S300), it is determined whether to operate the PDCMS function of the vehicle based on the mapping table. Specifically, it is determined whether the conditions that the PDCMS function on the mapping table may be operated are satisfied based on the combination of the pedestrian state and the vehicle state. That is, if it is determined that the obstacles are a pedestrian, the risk of collision is determined on the mapping table using the pedestrian information and the vehicle information.

Further, in the operating of the PDCMS function (S300), the PDCMS function of the vehicle is operated if it is determined that the pedestrian state and the vehicle state satisfy the conditions that the PDCMS function may start on the mapping table. The PDCMS function includes activating the operation of the warning unit to inform the driver of the collision of the pedestrian with the vehicle and activating the operation of the brake regardless of whether the driver operates the brake. The activation of the operation of the warning unit and the activation of the operation of the brake are performed in order of the operation of the warning unit, the partial braking of the vehicle, and the full braking of the vehicle.

Meanwhile, it should be understood that the PDCMS was described as an example for convenience of description in the present specification. As described above, it should be understood that the PDCMS is only one of several ADAS functions, and that the PDCMS implementations presented by the present disclosure may also be used to implement other ADAS functions involved. For example, the system presented by the present disclosure may be applied to implement one or a combination of ones of the ADAS functions such as the PDCMS, a lane change decision aid system (LCDAS), a land departure warning system (LDWS), an adaptive cruise control (ACC), a lane keeping assistance system (LKAS), a road boundary departure prevention system (RBDPS), a curve speed warning system (CSWS), a forward vehicle collision warning system (FVCWS), and low speed following (LSF).

The apparatus for activating a PDCMS of a vehicle according to the embodiment of the present disclosure may classify the gaze of the pedestrian into the front, the diagonal, the rear, and the side to identify whether the pedestrian may recognize the vehicle or not and then apply the identified situation to the operation of the PDCMS, such that the vehicle braking control may be performed by being delayed by the predetermined time only when the pedestrian may recognize the vehicle.

Therefore, the apparatus for activating a PDCMS according to the embodiment of the present disclosure may more accurately detect the pedestrian to effectively protect the pedestrian and optimize the vehicle braking control unnecessarily frequently performed to resolve the sense of difference and discomfort of the driver, thereby improving the commerciality of the vehicle.

The foregoing includes examples of one or more embodiments. Of course, all possible combinations of components or methods for the purpose of describing the embodiments described above are not described, but those skilled in the art may recognize that many combinations and substitutions of various embodiments are possible. Accordingly, the described embodiments are intended to embrace all the alternatives, modifications and variations that fall within the spirit and scope of the appended claims. Moreover, in connection with the extent that the term "include" in the detailed description or the appended claims is used, the term are intended to be inclusive in a manner similar to "consisting" as interpreted when the term "configured" is used as a transitional word in the appended claim.

What is claimed is:

1. An apparatus for activating a pedestrian detection and collision mitigation system (PDCMS) of a vehicle, the apparatus comprising:
   a front detection sensor detecting a presence of a pedestrian on a driving lane of the vehicle, gaze information of the pedestrian, and a distance and a relative speed between the pedestrian and the vehicle;
   a vehicle sensor detecting at least one of a speed, an acceleration, a steering angle, a steering angular velocity, or a pressure of a master cylinder of the vehicle;
   an electronic control unit activating a PDCMS function based on information detected by the front detection sensor and the vehicle sensor; and
   a warning unit operating to inform a driver of a collision of the pedestrian with the vehicle by a control of the electronic control unit,
   wherein the PDCMS function includes activating an operation of the warning unit and activating an operation of a brake regardless of whether the driver operates the brake,
   wherein the activation of the operation of the warning unit and the activation of the operation of the brake are performed in order of the activation of the operation of the warning unit, a partial braking of the vehicle, and a full braking of the vehicle,
   wherein the electronic control unit determines that the PDCMS function is operating, if the speed of the vehicle is between a first speed value and a second speed value and a speed of the pedestrian on the driving lane on which the pedestrian is moving is between a third speed value and a fourth speed value, and
   wherein when a horizontal length of an entire face of the pedestrian is defined as x, a horizontal length from a left face contour to a left eye of the pedestrian is defined as x1, a horizontal length from a right face contour to a right eye of the pedestrian is defined as x2, and a horizontal length between the left eye and the right eye of the pedestrian is defined as x3, the gaze information of the pedestrian corresponds to a front or a diagonal if $|(x1-x2)/x|<a$, a rear if $x1=x2=x3=0$, and a side if $|(x1-x2)/x|\geq a$ or $x1=0$ or $x2=0$, and the a is selected in a range between 0.65 and 0.95.

2. The apparatus of claim 1, wherein the front detection sensor includes at least one of a camera, a radar, or a Lidar.

3. The apparatus of claim 1, wherein the electronic control unit performs the activation of the operation of the warning unit and the activation of the operation of the brake by delaying the activation of the operation of the warning unit and the activation of the operation of the brake by a predetermined time when the gaze information of the pedestrian is the front or the diagonal, compared to when the gaze information of the pedestrian is the rear or the side.

4. The apparatus of claim 1, wherein the vehicle sensor further includes at least one of a rain sensor, a temperature sensor, or an illumination sensor.

5. The apparatus of claim 1, wherein the electronic control unit performs the activation of the operation of the brake so that the speed of the vehicle is reduced to at least a predetermined speed or more from a first time when the operation of the brake is activated to a second time when the collision of the pedestrian with the vehicle occurs.

6. The apparatus of claim 1, wherein the electronic control unit permits the driver to operate the brake for a maximum possible deceleration even after the activation of the operation of the brake starts.

7. The apparatus of claim 1, wherein the electronic control unit controls the warning unit to inform the driver that the PDCMS function is in an available state.

8. The apparatus of claim 1, wherein the warning unit includes a display visually informing the driver of the collision of the pedestrian with the vehicle.

9. The apparatus of claim 1, wherein the PDCMS function further includes an operation of a rear brake lamp.

10. The apparatus of claim 1, wherein the PDCMS function further includes an operation of an electrical stability control (ESC).

11. The apparatus of claim 1, wherein the warning unit includes a speaker audibly informing the driver of the collision of the pedestrian with the vehicle.

12. A method for activating a pedestrian detection and collision mitigation system (PDCMS) of a vehicle, the method comprising:

detecting, by a front detection sensor, pedestrian information including a presence of a pedestrian on a driving lane of the vehicle, gaze information of the pedestrian, and a distance and a relative speed between the pedestrian and the vehicle;

detecting, by a vehicle sensor, vehicle information including at least one of a speed, an acceleration, a steering angle, a steering angular velocity, or a pressure of a master cylinder of the vehicle; and activating, by an electronic control unit, a PDCMS function based on the pedestrian information and the vehicle information, wherein the PDCMS function includes activating an operation of a warning unit operating to inform a driver of a collision of the pedestrian with the vehicle and activating an operation of a brake regardless of whether the driver operates the brake, wherein the activation of the operation of the warning unit and the activation of the operation of the brake are performed in order of the activation of the operation of the warning unit, a partial braking of the vehicle, and a full braking of the vehicle, wherein the method further comprises determining that the PDCMS function is operating, if the speed of the vehicle is between a first speed value and a second speed value and a speed of the pedestrian on the driving lane on which the pedestrian is moving is between a third speed value and a fourth speed value, wherein, when a horizontal length of an entire face of the pedestrian is defined as x, a horizontal length from a left face contour to a left eye of the pedestrian is defined as x1, a horizontal length from a right face contour to a right eye of the pedestrian is defined as x2, and a horizontal length between the left eye and the right eye of the pedestrian is defined as x3, the gaze information of the pedestrian corresponds to a front or a diagonal if $|(x1-x2)/x| < a$, a rear if $x1=x2=x3=0$, and a side if $|(x1-x2)/x| \geq a$ or $x1=0$ or $x2=0$, and the a is selected in a range between 0.65 and 0.95.

* * * * *